Oct. 19, 1954     H. W. TREVASKIS ET AL     2,692,100
BRAKING SYSTEM FOR AIRCRAFT Filed April 17, 1951

Oct. 19, 1954  H. W. TREVASKIS ET AL  2,692,100
BRAKING SYSTEM FOR AIRCRAFT
Filed April 17, 1951  7 Sheets-Sheet 5

Fig.8

Patented Oct. 19, 1954

2,692,100

UNITED STATES PATENT OFFICE 2,692,100

BRAKING SYSTEM FOR AIRCRAFT

Henry William Trevaskis, Solihull, and Frank Radcliffe Mortimer, Styvechale, Coventry, England, assignors to Dunlop Rubber Company Limited, London, England, a British company Application April 17, 1951, Serial No. 221,436

13 Claims. (Cl. 244—111)

This invention relates to fluid-pressure operated braking systems for aircraft, and more particularly relates to means for preventing the application of the landing wheel brakes before the aircraft has touched down.

Whilst the pilot of an aircraft normally applies his brakes only when the aircraft, on landing, has settled evenly on the runway, nevertheless, it is possible that the pilot might inadvertently apply his brakes before the moment of impact, i. e. before the landing wheels have commenced to rotate. The wheels would lock, and would skid on landing, with consequent damage to the tyres.

It is the object of this invention to provide a device for preventing the application of landing wheel brakes before the aircraft wheel rotates on touching down.

According to the invention a device for preventing the application of fluid pressure operated aircraft brakes before the landing wheels rotate on touching down, comprises a valve, means for connecting it between a source of pressure fluid and a fluid pressure operated wheel brake, means actuated by lowering movement of the undercarriage for closing the valve, centrifugally operated mechanism for opening said valve and means for operatively connecting said mechanism to an associated wheel.

The majority of aircraft are provided with a retractable undercarriage, and usually the undercarriage is operated by means of fluid pressure operated jacks. It is preferred that the means for closing said valve shall comprise a piston and cylinder mechanism which can be connected to the fluid pressure lines controlling the movement of the undercarriage, so that valve closure takes place automatically when the undercarriage is lowered.

The device of the present invention is most advantageously utilised in conjunction with the automatic braking apparatus described in our co-pending patent application Ser. No. 195,509, filed November 14, 1950, now Patent No. 2,656,017 of October 20, 1953.

The invention will now be more particularly described with reference to the drawings which illustrate one embodiment in which the automatic braking apparatus referred to above is not employed and another embodiment in which a device in accordance with the invention is associated with said apparatus. Certain features of the drawings are common to both embodiments.

The first embodiment is illustrated in cross-section in Figure 1 and other details are shown in Figures 2, 4, 5 and 8. The second embodiment is shown in Figures 2, 3, 4, 5, 6, 7, and 8. Details of the various drawings are as follows.

Figure 1:
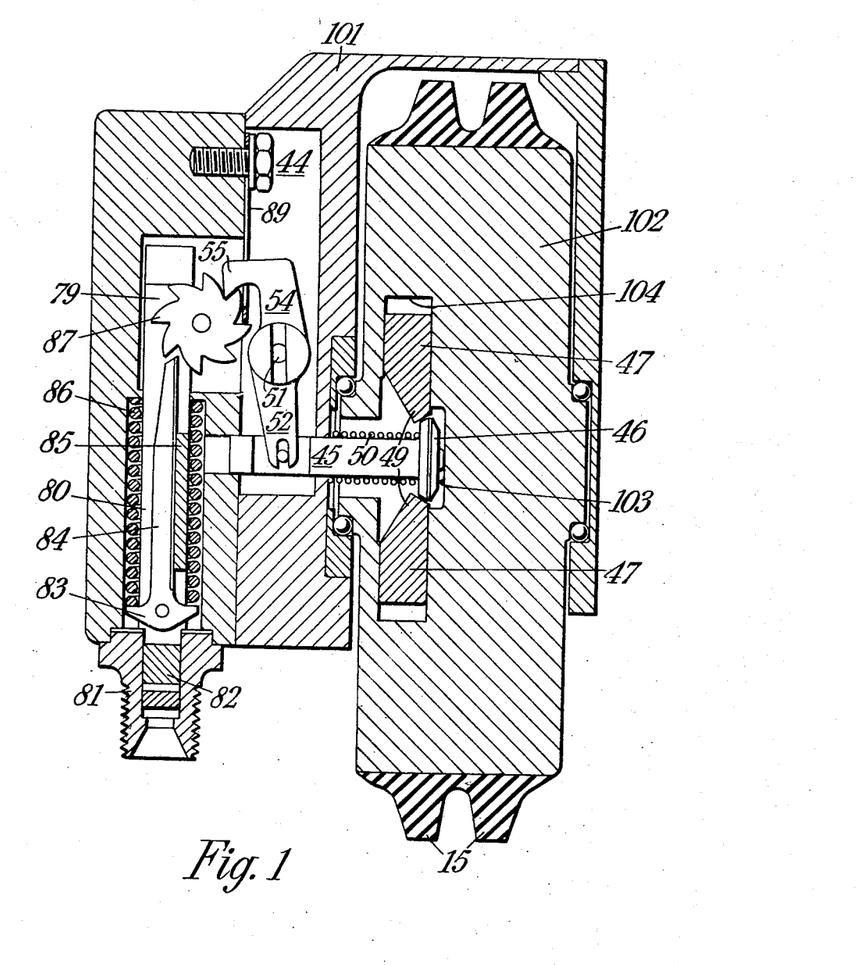
Figure 1 is a section of a device in accordance with the present invention

In one embodiment of the invention (Figure 1), a device for preventing the application of fluid-pressure operated aircraft brakes before the landing wheels rotate on touching down comprises a bracket 101 secured by bolts to a non-rotatable portion of a wheel and brake assembly. A rotatable member 102 is rotatably mounted in said bracket and is provided on its outer periphery with a solid rubber twin-contact tyre 15 which is adapted to contact the inner periphery of the wheel rim, whereby the member rotates with the wheel.

Figure 8:
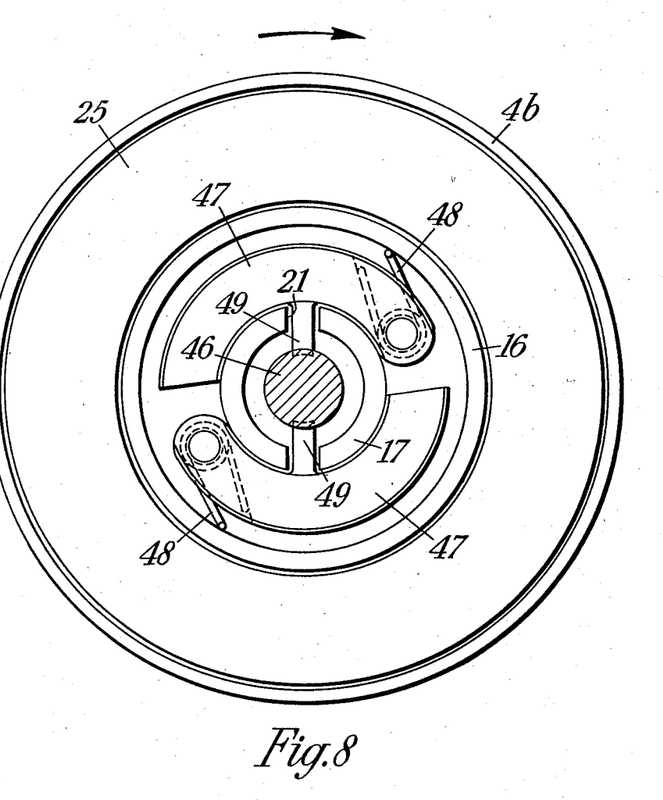
Figure 8 is a part section through D—D of Figure 3, looking in the direction of the arrows.

One arm of the bracket is thicker than the other arm, and is provided with a recess 44 on the side thereof remote from the rotatable member, and from one end of the base of the recess a hole, co-axial with the rotatable member, extends through the arm. An operating rod 45 slidably extends through said hole and into an axially-extending hole 103 provided centrally in the adjacent face of the rotatable member. The end of the rod within the hole is provided with an outwardly-extending annular member 46, the edges of said member being chamfered. An annular recess 104 extends radially outwardly from the sides of said hole intermediate its ends. Pivotally secured in said recess are two diametrically-opposed arcuate shaped centrifugal releases 47 (Figure 8). Each release is spaced a short distance from the peripheral wall of the recess and is pivotable about the end of the release presented towards the direction of rotation of the rotatable member. A light spring 48 is provided which urges the free end of each release inwardly of said member. On the inner periphery of each release, substantially midway between its ends, a peg 49 extends radially inwards to engage on one side or the other of the annular member 46.

The end face of each peg is chamfered at an angle complementary to the chamfer of the annular member associated with the operating rod and extends radially inwardly beyond the level of the periphery of the annular member. The pegs normally engage the side of the annular member remote from the base of the hole 103, the operating rod being urged towards the base of the hole by a helically wound compression spring 50 encircling said rod which has one end abutting the annular member and the other end abutting the adjacent arm of the bracket.

The end of the operating rod remote from the flywheel projects a short distance out of the recess 44 in the face of the said arm, and the portion of the operating rod within the recess is provided with a flat side. Pivotally secured to said side is one end of a cranked lever which comprises a spindle 51, (Figures 1, 4 and 5) a lever arm 52 integral with one end thereof and a lever arm 53, secured to the other end thereof. Said lever arms are diametrically opposed and of equal length and the end of the arm 52 is secured to the flat of the operating rod by a pin. Extending diametrically opposite the lever arm 52 is an arm 54 provided at its end with a pawl 55 for a purpose to be later described.

A second recess 56 (Figures 4 and 5) is provided in the said arm of the bracket adjacent the recess 44, the longitudinal axes of said recesses being parallel. The spindle of the cranked lever is rotatably fitted through a hole extending between the said recesses. Thus the lever arm 52 is situated in recess 44 and the lever arm 53 is situated in recess 56. A sealing washer 57 (Figure 5) is provided in recess 56 to prevent leakage of pressure fluid through the hole between the recesses.

Figure 4:
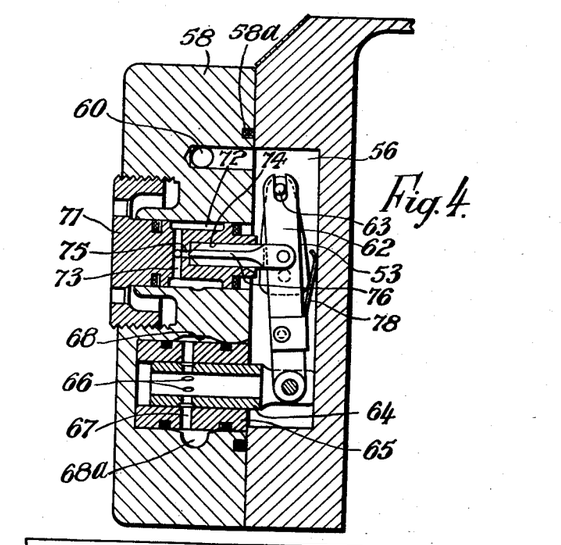
Figure 4 is a part section through B—B of Figure 2, looking in the direction of the arrows.
Figure 5:
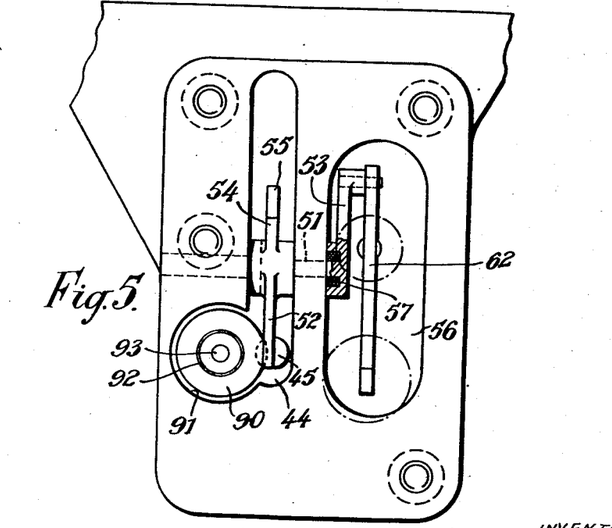
Figure 5 is a view in the direction of arrow D of Figure 3, with the valve body removed.

A rectangular valve body 58, details of which are shown in Figure 4, is secured to the face of the arm 3 remote from the housing, and said body converts the two recesses 44 and 56 into chambers. The chamber 56 is made substantially fluid-tight by the provision of a sealing ring 58a around the periphery thereof. The valve body is provided with a blind hole communicating with the recess 44 and axially in line with the operating rod 45, into which the end of the said rod is slidably fitted. A pressure fluid conduit 60 within the valve body communicates at one end with the pressure chamber 56 and at the other end with two brake operating nozzles 61 (Figure 2) adapted to be connected to two fluid pressure operated mechanisms of the associated aircraft wheel brake.

A valve beam 62 (Figure 4) is longitudinally disposed within the pressure chamber 56, and one end of said beam is slotted and a peg 63 integral with the end of the lever arm 53 is located in said slot. To the other end of the valve beam is pivotally connected one end of a tubular inlet slide valve 64, which operates in a liner 65 fitted in a hole in the valve body communicating with the pressure chamber 56, and has a portion adapted to abut the wall of the chamber adjacent the housing. The slide valve is provided with a plurality of radially extending holes 66 communicating with an annular groove in the outer periphery of the valve, and in one position of said valve the recess communicates with a plurality of radially extending holes 67 through the liner 65. These holes communicate with an annular groove 68 around the periphery of the hole in the valve body and said groove in turn communicates with a pressure conduit 68a leading to an inlet nozzle 69 which is adapted to be connected to a source of fluid pressure. A filter 70 is fitted within the inlet nozzle to prevent entry of foreign matter to the valve.

An exhaust valve plug 71 (Figure 4) has a screwed head portion fitted in a threaded hole in the outer face of the valve body and a barrel portion slidably fitted in a hole extending through the body and communicating with the pressure chamber 56. The barrel portion is provided on its outer periphery with an annular recess 72 of rectangular section and from the end of the recess remote from the pressure chamber a plurality of holes 73 extends diametrically across said portion. A hole 74 extends axially from the pressure chamber end of the barrel and terminates a short distance from the holes 73 and a smaller coaxial hole 75 connects the end of hole 74 and the junction of the diametric holes 73. The junction of the hole 75 and the hole 74 forms the exhaust valve seat.

Figure 2:
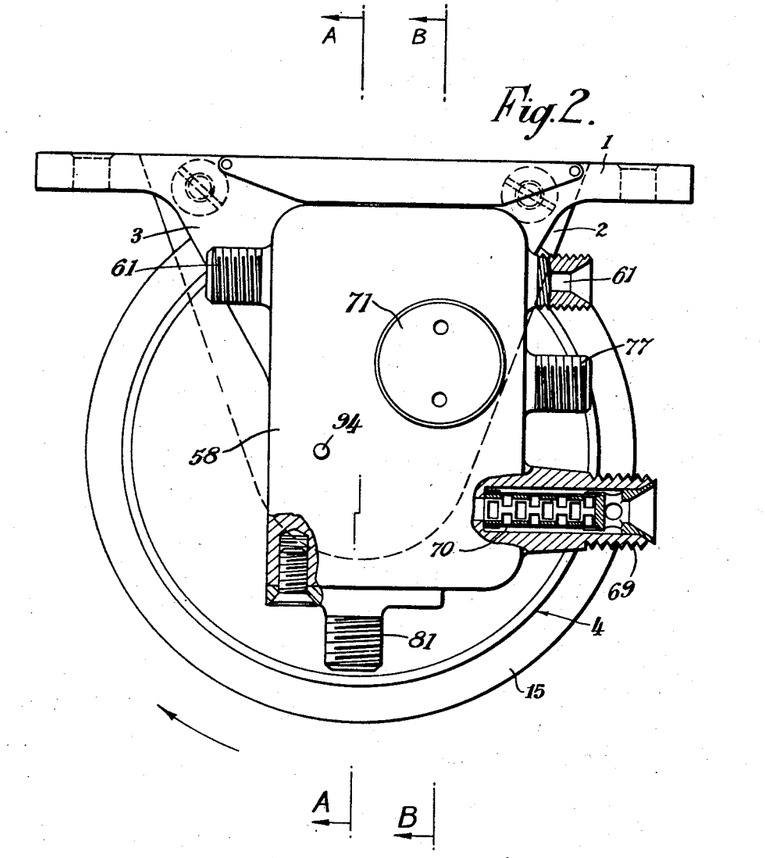
Figure 2 is a side elevation, partly in section, of one embodiment of an automatic brake apparatus and device of the present invention looking in the direction of arrow D of Figure 3.

An exhaust valve 76 is slidably fitted in the hole 74, one end thereof being tapered to seat on the exhaust valve seat and the other end being pivotally connected to the valve beam 62 intermediate its ends and about one-third of its length from the slotted end. The valve is provided with longitudinally extending flutes to enable pressure fluid to pass along the hole 74. A conduit (not illustrated) communicates at one end with the annular recess 72 and at the other end with an exhaust nozzle 77 (Figure 2). The valve beam 62 is provided with a leaf-spring 78 which has one end secured to said beam adjacent the inlet valve and the other end abutting the wall of the pressure chamber adjacent the housing and substantially in line with the exhaust valve. This spring serves to ensure that the exhaust valve closes before the inlet valve opens and opens after the inlet valve closes.

The valve body 58 is provided with a chamber 79 (Figure 1) communicating with the recess 44 situated in the arm of the housing. Said chamber is provided at one side with a cylindrical extension 80 extending parallel with the recess 44 and out of one side of the valve body. A nozzle member 81 is fitted to the end of said extension and is formed internally with a cylindrical bore in which a piston 82 is slidably fitted. The piston is provided with a lug extending into the cylindrical extension 80 and secured to said lug is a flanged end 83 of a plunger 84 which is slidable in guides 85 in said cylindrical extension. A helical spring 86 is fitted in compression between the flanged end of the plunger and an abutment formed in the end of said extension remote from said flange.

A ratchet wheel 87 is rotatably mounted on a spindle extending across the chamber 79, the axis of the spindle being normal to the longitudinal axes of the recess 44 and chamber 79. The end of the plunger 84 is chamfered and is adapted to register with one of the teeth of said wheel, whilst the pawl 55 at the end of arm 54 is also adapted to register with one of said teeth. A leaf-spring 89, secured at one end to the side of the valve body within the recess 44 has an end adapted to ensure positive movement of the wheel 87. The nozzle member 81 is adapted to be secured to the hydraulic pipeline leading to the lowering or extension end of an associated undercarriage jack.

The operation of the device hereinabove described will be described in conjunction with the preferred embodiment of the invention, in which it is associated with an automatic apparatus for controlling the flow of pressure fluid to the fluid pressure operated barkes.

In the preferred embodiment of the invention (Figures 2 and 3) the automatic brake apparatus and device of the present invention comprises a flange 1 adapted to be secured by bolts to a non-rotatable portion of a wheel and brake assembly, for example, the torque plate. A bifurcated bracket integral with the flange has two arms 2 and 3 extending normally from the face of the flange. Rotatably mounted in said bracket is a hollow cylindrical housing 4, comprising a radially-extending wall 4a and axially-extending peripheral wall 4b integral therewith, and a separable radially-extending wall 4c.

The radial wall 4a of the housing is provided centrally with a boss 5 which extends axially an equal distance both interior and exterior of the housing, and the periphery of the boss is provided with a metal bearing 6. The face of the boss interior of the housing is provided centrally with a cylindrical recess 7. The part of the boss exterior of the housing runs in ballbearings 8 which are held between the bearing 6 on said part of the boss and a bearing 9 located in the arm 2 of the bifurcated bracket adjacent the end of said arm.

The other radial wall 4c of the housing is provided centrally with a circular hole and an annular flange 10, and said flange extends an equal distance both interior and exterior of the housing. The outer periphery of the flange is provided with metal bearings 11, similar to those on the boss, and the part of the flange exterior of the housing runs in ball-bearings 12 which are held between the bearing 11 on said part of the flange and a bearing 13 located in the arm 3 of the bifurcated bracket adjacent the end of said arm. Sealing rings 14 are provided to prevent ingress of foreign matter to both ballbearings 8 and 12.

The exterior periphery of the housing, i. e. the axially-extending wall 4b, is provided with a solid rubber twin-contact tyre 15, which is adapted to contact the inner periphery of the wheel rim. The housing thus rotates freely when the wheel rotates.

Figure 6:
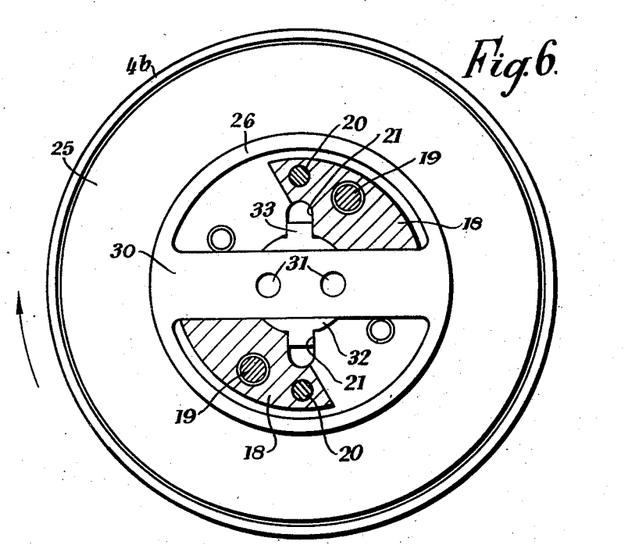
Figure 6 is a part section through C—C of Figure 3 looking in the direction of the arrows.

An annular drum member is fitted within the housing, and said drum-member comprises two coaxial drums 16 and 17 spaced apart by two diametrically opposed substantially arcuate portions 18 (Figure 6). The drum-member is for convenience made in two parts each comprising half the axial width of outer drum 16 and inner drum 17 and a part of the arcuate portions 18, and the two drum parts held together by screws 19 and dowels 20, passing through the arcuate portions 18. The two ends of the inner periphery of the inner drum 17 seat on the bearings 6 and 11 on the interior portions of the boss and flange respectively and may rotate on said bearings. The inner drum 17 is provided on each side with two diametrically opposed, axially-extending slots 21, for a purpose to be later described.

Figure 3:
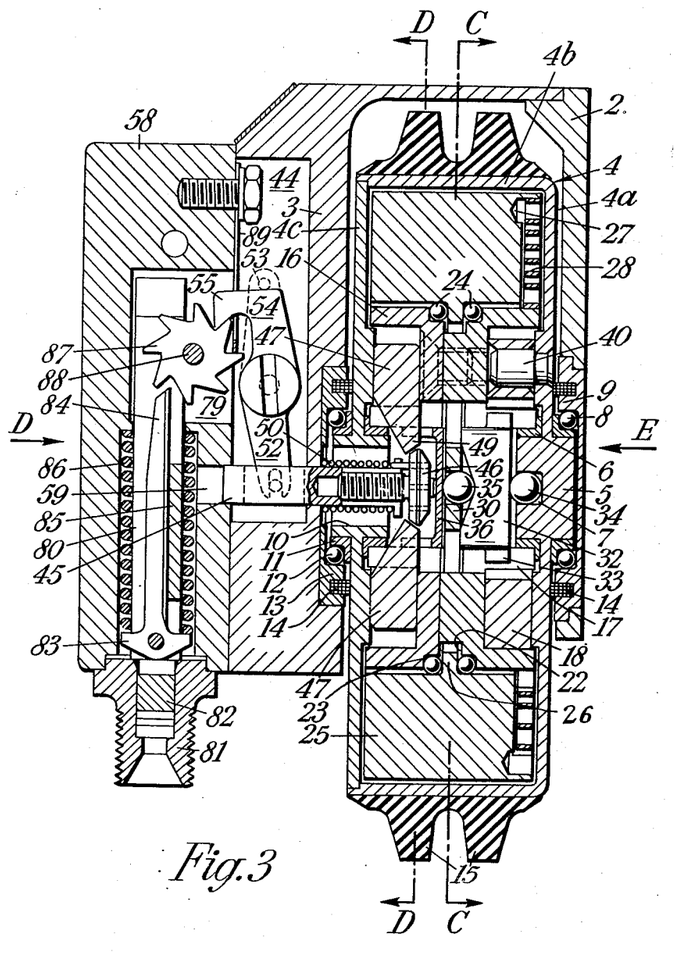
Figure 3 is a section through A—A of Figure 2, looking in the direction of the arrows.

The outer periphery of the outer drum 16 is provided, in the median plane thereof, with a circumferentially-extending slot 22, Fig. 3, and on each side of said slots is a circumferentially-extending recess 23 of rectangular section. Each of said recesses accommodates a series of ballbearings 24.

An annular space is provided between the outer periphery of the outer drum 16 and the inner periphery of the housing and an annular flywheel 25 of considerable weight is located within said space. The inner peripihery of the flywheel is provided with a radially-extending rib 26, Figs. 3 and 6, which fits within the slot 22 without contacting the sides or edges thereof and serves to prevent axial-misalignment of said ball-bearings. The inner periphery of the flywheel rests on said ball-bearings which allow relative rotation between flywheel and drum member with little or no frictional resistance.

Figure 7:
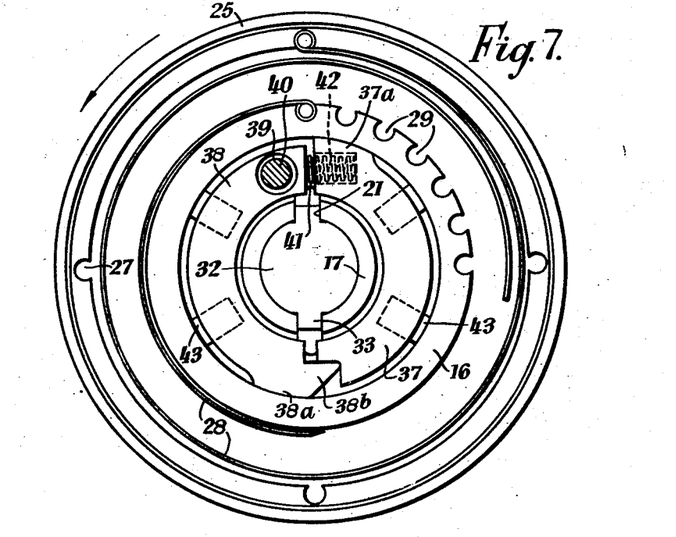
Figure 7 is a part view in the direction of arrow E of Figure 3 with the flywheel casing and bracket arm removed.

The radially-extending face of the flywheel adjacent the housing wall 4a is recessed from a location adjacent its outer periphery to its inner periphery and said face is provided, adjacent its outer periphery, with a plurality of equispaced, axially-extending blind holes 27 which break into the side of said recess. A clock-type coiled spring 28 is fitted in said recess, one end thereof being formed into an eye and secured in one of said holes 27. The edge of the outer drum 16 adjacent said housing wall 4a is likewise provided with a plurality of blind holes 29 (Figure 7) which break into the outer periphery of said outer drum, and the inner end of the clock-spring is likewise formed into an eye, which is secured in one of said holes.

A thin beam 30 of rectangular section extends diametrically across the interior of the flywheel in the median plane thereof, and is integral with said flywheel. The beam passes between the arcuate portions 18 of the drum which act as stops to restrict the relative angular movement between the drum and the flywheel. Said beam is provided with two equi-sized holes 31 spaced one on each side of the centre of the beam and on the longitudinal axis thereof.

A cam member 32, Figs. 3 and 6, is slidably fitted within the inner periphery of the inner drum 17 and said cam member is provided with two diametrically opposed keys 33 which engage in the slots 21 in said drum. The cam member is thus rotatable with the drum and axially slidable relative thereto. The cam member is fitted between the beam 30 of the flywheel and the boss 5 of the housing, and an anti-friction ball 34 is provided in the recess 7 in the boss against which the plane face of the cam member abuts. The other face of the cam member, i. e. that adjacent the beam, is provided with a shallow recess of V-section. Two balls 35, situated one in each of said holes 31 of the beam are adapted, in one angular position of the beam, to lie in the apex of the V-sectioned recess in the cam member. The balls are prevented from quitting said holes by a disc 36 which slidably fits in the inner periphery of the inner drum on the side of the beam remote from the cam member.

A clutch mechanism is fitted in the annular recess between the inner and outer drums 16 and 17 on that side of the drum member adjacent the housing wall 4a. Said clutch comprises two part-annular torque-arms 37 and 38 (Figure 7) arranged to form substantially a complete annulus within said recess. A clearance is provided between the inner periphery of each of said torque arms and the outer periphery of the inner drums 17. A similar clearance is provided between the outer periphery of said arms and the inner periphery of the outer drum 16 except that each of said arms is provided integrally at one end with a radially extending portion 37a and 38a, which frictionally engages said inner periphery.

The torque arm 38, adjacent the end remote from the portion 38a is provided with an axially extending hole 39 and fitting in said hole is a stud 40 which is secured to the housing wall 4a. Said end is likewise provided with a substantially tangentially-extending coiled helical spring 41 having one end secured thereto and the other end fitting in a coaxial hole 42 in the adjacent end of the torque arm 37.

The end of the torque arm 37 remote from the portion 37a is provided, on its outer peripheral surface, with a rectangular recess, into which fits a wedge-shaped portion 38b integral with the associated end of the torque arm 38. The spring 42 thus urges the associated ends of torque arms 37 and 38 apart, and forces the portion 37a and 38a into frictional contact with the inner periphery of the outer drum 16. The construction of the clutch mechanism is such that rotation of the aircraft wheel, housing and clutch mechanism relative to the drum-member in one direction, i. e. forward rotation of the aircraft wheel, produces a considerable "wedging" or servo-action of the torque-arms about the drum-members; whereas relative rotation of the clutch mechanism in the other direction produces only a proportion of this torque, and no servo-action is obtained. Grease retainers 43 are provided in the outer periphery of torque arms 37 and 38 to lubricate the frictional surface of the brake drum.

The arm 3 of the bifurcated bracket is considerably thicker than the arm 2 and is of rectangular shape. On the face of the arm 3 remote from the flywheel a substantially rectangular recess 44 (Figures 3, 4, and 5) is provided and from one end of the base of the recess a hole, coaxial with the housing, extends through the arm. An operating rod 45 slidably extends through said hole and has one end projecting into the housing and the other end projecting into said recess. The end of the rod within the housing is rounded and abuts the disc 36, and adjacent said end an outwardly-extending annular member 46 is provided, the edges of said member being chamfered.

An annular recess is provided between the drum-members 16 and 17 on the side of the flywheel adjacent the arm 3 of the bracket. Pivotally secured in said recess are two diametrically opposed arcuate-shaped centrifugal releasable latches 47 (Figures 3 and 8). Each latch is spaced a short distance from the peripheral walls of the recess and is pivotable about the end of the latch presented towards the direction of rotation of the housing (indicated by the arrow). A light spring 48 is provided which urges the free end of each latch inwardly of the housing. On the inner periphery of each latch, substantially midway between its ends, a peg 49 extends radially inwards through the slots 21 of the inner drum 17.

The end face of each peg is chamfered at an angle complementary to the chamfer of the annular member associated with the operating rod and extends radially inwardly beyond the level of the periphery of said annular member. The pegs normally engage the side of the annular member remote from the disc. The angle of chamfer on one side of the member, on the one hand, and the pegs on the other, is such that movement of the operating rod away from the flywheel will force the pegs radially outwards, hence causing the latches to pivot about their ends, until the annular member passes out of engagement with the pegs, when the latches will again be moved radially inwards by their associated springs, locking the operating rod in its new position, in which the rounded end of the operating rod is spaced a short distance away from the disc. In this locked position of the operating rod the inlet valve of the associated valve mechanism is closed and the exhaust valve is open, so that pressure from the source cannot flow through to operate the brakes. The end of the operating rod is urged towards the disc by a helical spring 50 encircling said rod which has one end abutting the arm 3 of the housing and the other end abutting an annular flange on the rod adjacent the annular member 46.

The remainder of the apparatus, i. e. the device of the present invention, has been hereinabove described, and comprises the inlet and exhaust valve mechanism, and the means for locking the annular member 46 behind the pegs of the centrifugal releases by the lowering movement of an undercarriage.

The apparatus operates as follows. On coming in to land the pilot of the aircraft lowers his undercarriage. Pressure fluid flows into the extension side of the undercarriage jack and also flows into the cylinder formed in the nozzle member 81. An increase of pressure in this cylinder forces the associated piston outwardly, and this in turn moves the plunger against its compression spring.

The plunger, the ratchet wheel and the arm 54 with its associated pawl 55 are all so arranged relative to one another that movement of the plunger will turn the ratchet wheel and the wheel, in turning, moves the pawl to swing arm 54 away from it, deflecting the leaf-spring 89 in the process. The arm pivots about the spindle 51 and moves the lever arm 52 in the opposite direction. The end of this lever arm is pivotally secured to the operating rod, hence the operating rod is forced against its return spring 50 until the annular member on the operating rod locks behind the two pegs on the centrifugally releasable latches 47. The safety device is now "cocked" and even though the pilot applies braking pressure the pressure will be held at the valve mechanism, since the inlet valve is closed.

As the aircraft touches down the landing wheels commence to rotate, in turn spinning the housing and flywheel. The rotation of the flywheel causes the two centrifugally releasable latches, pivotally secured thereto, to pivot outwardly against the light springs, thus moving the pegs out of engagement with the annular lip on the operating rod. The rod moves back under the action of its return spring until one end abuts the member associated with the lifting cam mechanism. In this position of the operating rod the inlet valve is open and the exhaust valve closed, and braking pressure can flow through the valve mechanism to the wheel brakes.

Figure 9:
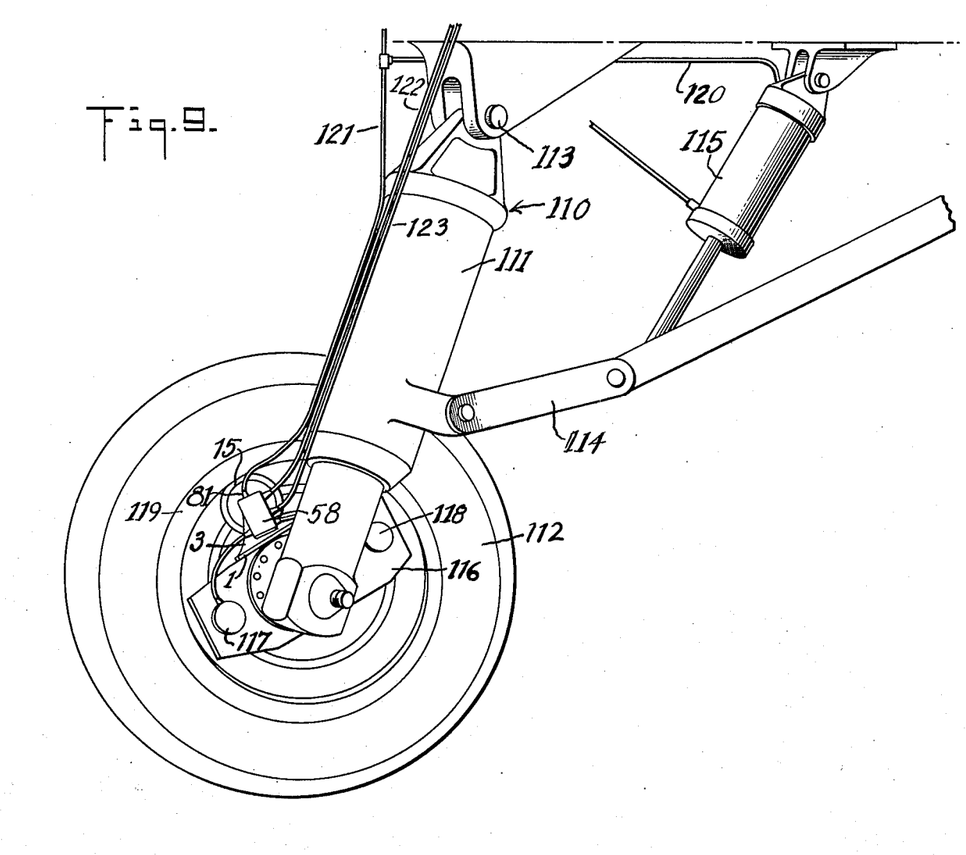
Fig. 9 is a view of a part of an undercarriage of an aircraft and wheel and the braking system of our invention, showing the relation of the control device to the undercarriage and wheel.

In Fig. 9 the brake pressure limiting device is illustrated as applied to the undercarriage 110 having a shock absorber 111 carrying a wheel 112. The shock absorber 111 is pivoted to the undercarriage 110 at 113 and may be swung about the pivot 113 to retracted or to lowered position by means of a linkage 114 operated by a fluid actuated cylinder and piston 115 between the undercarriage and the linkage. The lower end of the shock absorber carries a backing plate 116 for fluid operated brakes 117 and 118. The brake pressure limiting device is mounted on the backing plate in a position inverted from that of Fig. 2 with the contact tire 15 in rolling contact with a rim 119 of the wheel 116 to be rotated by the wheel.

Fluid under pressure for lowering the wheel 112 is supplied to the cylinder 115 through a conduit 120 from which a branch 121 leads to the connecting nozzle 81 and the piston 82 so that with each lowering of the wheel the piston 82 is displaced, rotating the ratchet wheel 87 a distance of one tooth. Fluid under pressure is supplied under the control of the pilot through a conduit 122 to the inlet nozzle 69 at the inlet of the valve 58, the exhaust nozzle 77 delivers to a return conduit 123. Fluid passing through the valve 64 is supplied to and exhausted from the brakes 117 and 118 through conduits 124 and 125, respectively.

The functioning of the automatic brake control apparatus is more fully described in copending application Ser. No. 195,509, filed November 14, 1950, now Patent No. 2,656,017 of October 20, 1953. Briefly, as each landing wheel rotates, it causes the housing associated therewith to rotate. The stud extending axially from one wall of the housing and engaging in a hole in one of the torque arms of the clutch mechanism causes the said clutch to rotate with the housing and with the drum-member stationary and the torque-arms rotating with the housing a considerable amount of torque is obtained, as hereinabove described, which is sufficient to drive the drum almost instantaneously. There is, in fact, a fractional amount of slip, just sufficient to cushion the shock and prevent damage to the flywheel beam and associated parts. The beam of the flywheel is held against the arcuate-shaped stops of the drum member by the inertia of the flywheel and by the force of the clockspring, and hence there is no relative angular movement between the flywheel and drum member. The cam member is keyed to the inner drum and so rotates with the drum and the two balls situated in the holes in the flywheel beam remain seated in the bottom of the V-shaped recess. No linear movement is thus imparted to the thrust rod and the inlet valve remains open and the exhaust valve shut. All the components within the housing, with the exception of the thrust rod, are now rotating at the same speed as the housing.

As the landing aircraft settles evenly on the runway the pilot applies his control which allows pressure fluid to flow through the valve and to the wheel brakes and so apply braking pressure. The wheel will decelerate and the housing, rotated by the wheel, decelerates at the same rate. The torque arms of the clutch mechanism are mechanically keyed to the housing and also decelerate with the wheel and housing. A low torque value is obtained between torque arms and drum-member during relative angular displacement in this direction and this torque decelerates the drum comparatively slowly. If the deceleration of the wheel is such that skidding is liable to occur, the flywheel, having a greater inertia, takes up an angular position against the force of its associated clockspring such that the beam swings through the permitted arc between the arcuate segments, or stops, of the drum member. The cam member is keyed to the drum, and hence the balls in the two holes in the flywheel beam ride up the inclined sides of the V-shaped recess in said cam member, forcing the disc, on the other side of the beam, in an axial direction away from the cam member.

The thrust-rod has one end abutting this disc, and is forced, against its associated spring, away from the flywheel. This linear movement, acting through the cranked lever and through the valve beam first closes the inlet valve and then opens the exhaust valve. The braking pressure is thus relieved, and the wheel revolves normally once more before skidding actually occurs.

With the wheel and housing rotating normally the flywheel urged by the spring and due to the acceleration of the wheel, takes up its original angular position wherein the flywheel beam is abutting one side of the arcuate stops of the drum member, as previously described, and in this position the balls associated with the flywheel beam urged by the spring-loaded thrust rod and disc, move back into the bottom of the groove in the cam member, and this permits the thrust-rod to move sufficiently to first close the exhaust valve and then open the inlet valve, as previously described, and so re-apply the brakes.

It frequently happens, for testing and maintenance purposes, that the aircraft is jacked-up off the ground and the undercarriage wheels, brakes and the like are independently tested. Lowering of the undercarriage however renders the brakes inoperative until the wheels are rotated at such a speed as to operate the centrifugal release mechanism. This is obviously undesirable for a static test and accordingly means are provided whereby the operating rod may be manually placed in its operative position, wherein the inlet valve is open and the exhaust valve closed. Said means comprises a plunger 90 (Figure 5) slidable in a cylindrical recess 91 in the arm 3 and communicating with the recess 44. Said plunger has a portion abutting the flat of the operating rod 45 and a helical spring 92 fitted in compression between said plunger and the side of the valve housing 58 maintains said plunger in contact with the shoulder of the operating rod adjacent the annular member 46. An indicating rod 93 secured to said plunger extends through a hole 94 (Figure 2) in said valve housing.

On lowering the undercarriage during a static test the operating rod is moved away from the housing, as hereinabove described, to close the inlet valve and open the exhaust valve. This movement of the operating rod, acting through the plunger 90, moves the indicating rod 93 so that the end thereof projects exterior of the hole 94. Should it be necessary to test the brakes, a manual pressure on the projecting end of the indicating rod will force the operating rod inwardly once more, deflecting the centrifugal releases in the process, so that the operating rod is again in its operative position in which the inlet valve is open and the exhaust valve closed.

What we claim is:

1. Brake control means adapted for use with an aircraft having a retractable undercarriage having rotatable wheels, which comprises a limiting valve for brake pressure fluid normally spring pressed to open, supply, position, means adapted to be operable by the lowering of said undercarriage to move said valve to closed, exhaust position and to release it, a driving element adapted to be rotated from a wheel of said aircraft, and a centrifugally releasable latch, spring pressed to hold said valve in closed position and pivotally mounted on said driving element eccentrically of the center of mass of said latch and rotatable centrifugally on its pivotal mounting to release said valve from closed position.

2. The brake control means of claim 1 in which said means operable by the lowering of said undercarriage comprises an indexing wheel having inclined tooth surfaces and a transmission element between said indexing wheel and said valve to engage and be moved by said inclined tooth surfaces successively.

3. The brake control means of claim 2 having a plunger displaceable by each lowering of said undercarriage to advance said indexing wheel a distance of one tooth for each lowering.

4. The brake control means of claim 1 in which said centrifugally releasable latch comprises a pair of arms pivoted on said driving element and spring pressed inwardly and a disc movable axially of said rotating element past the displaceable pivoted elements.

5. The brake control means of claim 1 in which said means operable by the lowering of said undercarriage comprises a piston and cylinder to receive pressure fluid from said lowering means, a spring loaded plunger connected to said piston, an indexing wheel rotatable by said plunger and having inclined tooth surfaces and surfaces engaged and moved successively by said plunger to rotate said indexing wheel, a lever to operate the limiting valve and engaged and driven by the inclined tooth surfaces in succession to close said limiting valve, and an operating rod connected to and moved by said lever to move said release to a position to hold said limiting valve closed.

6. Brake control means adapted for use with an aircraft having a retractable undercarriage having rotatable wheels, which comprises a limiting valve for brake pressure fluid normally spring pressed to open, supply, position and movable to closed, exhaust, position, means adapted to be operable by the lowering of said undercarriage to move said valve to closed, exhaust, position and to release said valve, a driving element adapted to be rotated from a wheel of said aircraft, a flywheel driven forwardly by said driving element and having a limited forward movement relative to said driving element, means actuated by a forward movement of said flywheel relative to said driving element to move said valve to closed, exhaust, position, and a centrifugally releasable latch, spring pressed to hold said valve in closed position and pivoted eccentrically of the center of mass of said latch and driven in rotation by said driving element to swing centrifugally to release said valve from closed position.

7. The brake control means of claim 1 which comprises a flywheel driven forwardly by said driving element and having a limited forward movement relative to said driving element and means actuated by a forward movement of said flywheel relative to said driving element to move said valve to closed, exhaust, position.

8. The brake control means of claim 7 having a spring to hold said flywheel resiliently back against said driving element.

9. The brake control means of claim 7 in which said means actuated by a forward movement of said flywheel relative to said driving element comprises a cam rotatable by said driving element and cam followers held by said flywheel.

10. The brake control means of claim 9 in which said driving element comprises a drum engaging said flywheel and said cam, a housing encircling said drum and having a peripheral tire for engaging an aircraft wheel and a yielding friction clutch between said housing and said drum.

11. The brake control means of claim 10 having a coil spring connected between said drum and said flywheel.

12. The brake control means of claim 11 in which said flywheel has a diagonal beam and said housing has projections symmetrically engaging said beam on opposite sides of the center of said flywheel and in which said coil spring holds said projections resiliently against said beam.

13. Brake control means adapted for use with an aircraft having a retractable and wheeled undercarriage and wheel brakes comprising a fluid pressure valve for controlling the wheel brake pressure normally spring-loaded to an open position to allow passage of pressure fluid from a source to said wheel brakes, means adapted to be operable by movement of said undercarriage to close said valve and prevent said passage of pressure fluid, a driving element adapted to be rotated by a wheel of said aircraft and a centrifugally releasable latch associated with said elements and spring-loaded inwardly to hold said valve in closed position and automatically movable on rotation of said driving element to open said valve.

References Cited in the file of this patent

UNITED STATES PATENTS

| Number | Name | Date |
|---|---|---|
| 2,107,823 | Hallot | Feb. 8, 1938 |
| 2,163,731 | Hallot | June 27, 1939 |
| 2,225,978 | Carmichael | Dec. 24, 1940 |
| 2,459,665 | Majneri | Jan. 18, 1949 |

FOREIGN PATENTS

| Number | Country | Date |
|---|---|---|
| 48,806 | France | May 3, 1938 |
| | (Addition to No. 814,603.) | |